United States Patent
Kuroda et al.

[19]

[11] Patent Number: 6,095,276

[45] Date of Patent: *Aug. 1, 2000

[54] FOUR-WHEEL DRIVE VEHICLE

[75] Inventors: Koji Kuroda; Takayuki Yakou; Kazunori Kobayashi; Tetsuro Hamada, all of Saitama, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/005,690

[22] Filed: Jan. 13, 1998

[30] Foreign Application Priority Data

Jan. 14, 1997 [JP] Japan .................................... 9-004864

[51] Int. Cl.[7] ................................................. B60K 17/354
[52] U.S. Cl. ........................................... 180/247; 180/248
[58] Field of Search .................................. 180/233, 247, 180/248, 249, 250; 701/69

[56] References Cited

U.S. PATENT DOCUMENTS

| | | | |
|---|---|---|---|
| 5,056,614 | 10/1991 | Tokushima et al. ..................... | 180/248 |
| 5,058,700 | 10/1991 | Shibahata et al. ...................... | 180/245 |
| 5,069,305 | 12/1991 | Kibayahi ................................. | 180/249 |
| 5,107,972 | 4/1992 | Sundquist ................................ | 192/35 |
| 5,119,900 | 6/1992 | Watanabe et al. ....................... | 180/245 |
| 5,135,071 | 8/1992 | Shibahata et al. ...................... | 180/248 |
| 5,141,072 | 8/1992 | Shibahata ................................ | 180/245 |
| 5,259,476 | 11/1993 | Matsuno et al. ........................ | 180/197 |
| 5,285,866 | 2/1994 | Ackroyd .................................. | 180/248 |
| 5,353,889 | 10/1994 | Hamada .................................. | 180/242 |
| 5,456,641 | 10/1995 | Sawase .................................... | 475/86 |
| 5,833,566 | 11/1998 | Showalter ............................... | 475/198 |

*Primary Examiner*—Kevin Hurley
*Assistant Examiner*—Andrew J. Fischer
*Attorney, Agent, or Firm*—Armstrong, Westerman, Hattori, McLeland & Naughton

[57] ABSTRACT

A rear differential in a four-wheel drive vehicle includes a left and right clutches adapted to distribute a driving force transmitted from front wheels through a propeller shaft to left and right rear wheels. If the engagement of the left and right clutches is released, only the front wheels are driven and in this manner, the vehicle is brought into a front wheel-drive state. If the left and right clutches are brought into their engaged states, both of the front wheels and the rear wheels are driven and in this manner, the vehicle is brought into a four-wheel drive state. By changing the engagement forces of the left and right clutches, different driving forces can be distributed to the left and right rear wheels. In addition, when a driver operates a differential lock switch, the left and right clutches, are brought into their engaged states with the maximum engagement force, thereby integrally coupling the propeller shaft to the left and right rear wheels to provide a differential-locked state. Thus, a differential lock mechanism can be provided to the differential in a simple structure.

1 Claim, 10 Drawing Sheets

FOUR-WHEEL DRIVE VEHICLE

BACKGROUND OF THE INVENTION

1. Field of the Invention

The present invention relates to a four-wheel drive vehicle which is capable of being switched over between a two-wheel drive state and a four-wheel drive state.

2. Description of the Related Art

The main type of the current four-wheel drive vehicles is a full-time type four-wheel drive vehicle including a front differential adapted to distribute a driving force between left and right front wheels, a center differential adapted to distribute the driving force between the front wheels and rear wheels, and a rear differential adapted to distribute the driving force between the left and right rear wheels. A part-time type four-wheel drive vehicle includes a clutch for intermittently transmitting the driving force to a transfer means adapted to transmit the driving force for the front wheels to the rear wheels.

To transmit the driving force to the left and right rear wheels, for example, when the vehicle runs out of a muddy place, the full-time type four-wheel drive vehicle is accompanied by a problem that it is necessary to mount a differential lock device on the center differential and the rear differential, resulting in an undesirabe increase in the number of parts and a complicated structure. The part-time type four-wheel drive vehicle is accompanied by a problem that because clutches are provided on the transfer means, the number of parts is increased, and the structure is complicated.

SUMMARY OF THE INVENTION

Accordingly, it is an object of the present invention to provide a part-time type four-wheel drive vehicle which is capable of being switched over between a two-wheel drive state and a four-wheel drive state, wherein a differential lock mechanism is provided to the differential in a simple structure.

To achieve the above object, according to the present invention, there is provided a four-wheel drive vehicle designed so that a driving force for one set of a set of front wheels and a set of rear wheels connected to an engine is distributed to the other set of the wheels through an input shaft and a differential, wherein the differential includes left and right clutches which are capable of coupling the other left and right wheels to the input shaft with any engagement force, and the clutches are brought into their engaged states with the maximum engagement force in response to the operation of an input means provided by a driver.

With such an arrangement, if the engagement of the left and right clutches mounted on the differential is released, one set of the front wheels and the rear wheels is driven, and in this manner, the vehicle can be brought into a two-wheel drive state. If the left and right clutches are brought into their engaged states, both of the front and rear wheels are driven, and in this manner, the vehicle can be brought into a four-wheel drive state. In this case, by changing the engagement forces of the left and right clutches, different driving forces can distributed to the other left and right wheels, and in this manner, a differential-lock mechanism can be exhibited. Moreover, when the vehicle driver operates the input means, the left and right clutches are brought into their engaged states with the maximum engagement force, and the input shaft and the other left and right wheels are integrally coupled to each other to provide a differential-locked state. For this purpose, only the engagement forces of the left and right clutches are controlled and hence, the structure is extremely simple.

BRIEF DESCRIPTION OF THE DRAWINGS

FIGS. 1 to 10 illustrate an embodiment of the present invention, wherein FIG. 1 is an illustration of the entire arrangement of a four-wheel drive vehicle;

FIG. 2 is a plan view of the entire rear differential;

FIG. 3 is an enlarged view of a portion of the differential shown in FIG. 2;

FIG. 4 is an enlarged view of a portion of the differential shown in FIG. 2;

FIG. 5 is an enlarged view of a portion of the differential shown in FIG. 2;

FIG. 6 is an enlarged sectional view taken along a line 6—6 in FIG. 4;

FIG. 7 is an enlarged view of an essential portion shown in FIG. 4;

FIG. 8 is a sectional view taken along a line 8—8 in FIG. 3;

FIG. 9 is a sectional view taken along a line 9—9 in FIG. 8; and

FIG. 10 is a graph illustrating the relationship between the vehicle speed and the maximum transmitted torque of the clutch.

DETAILED DESCRIPTION OF THE PREFERRED EMBODIMENT

Figure 1:
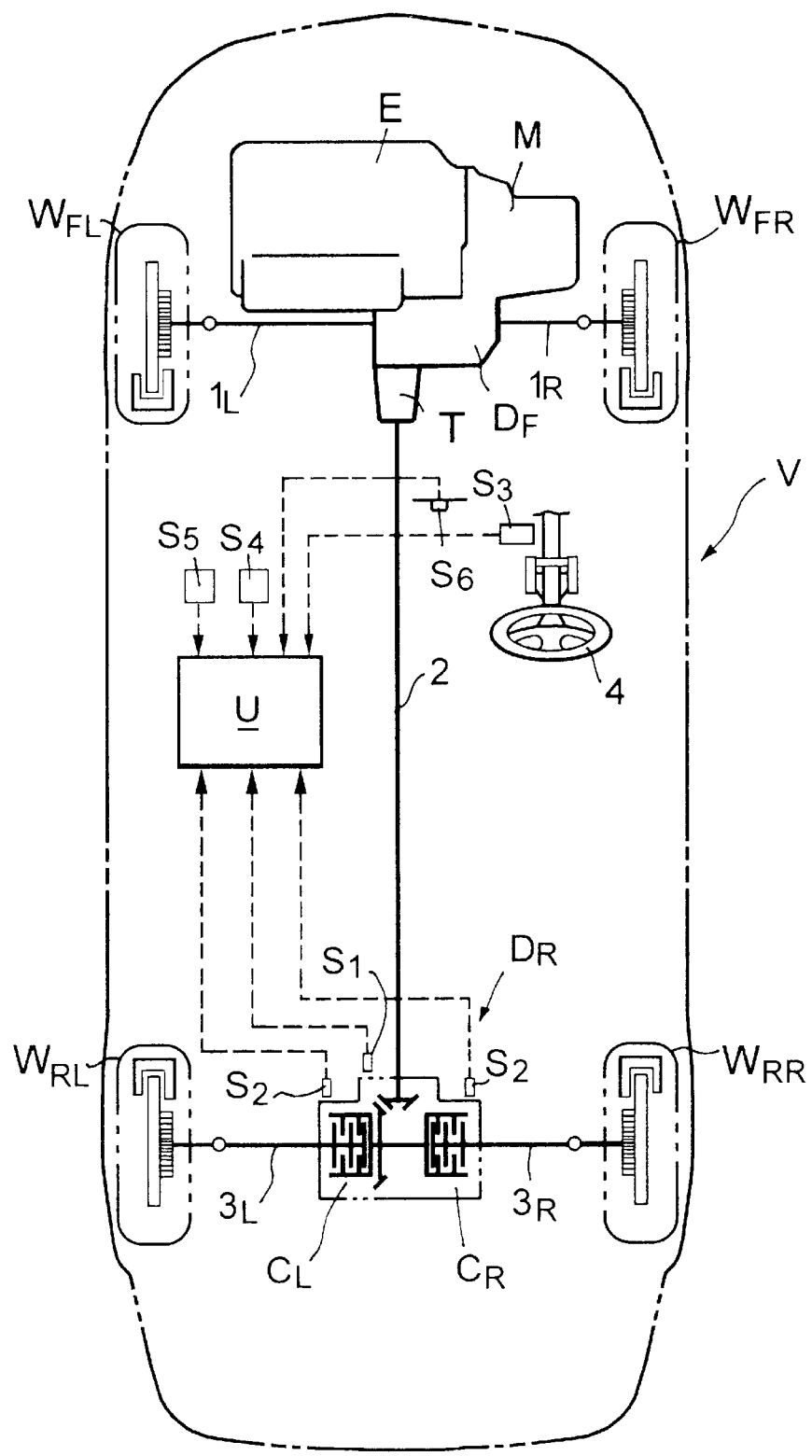
Figure 2:
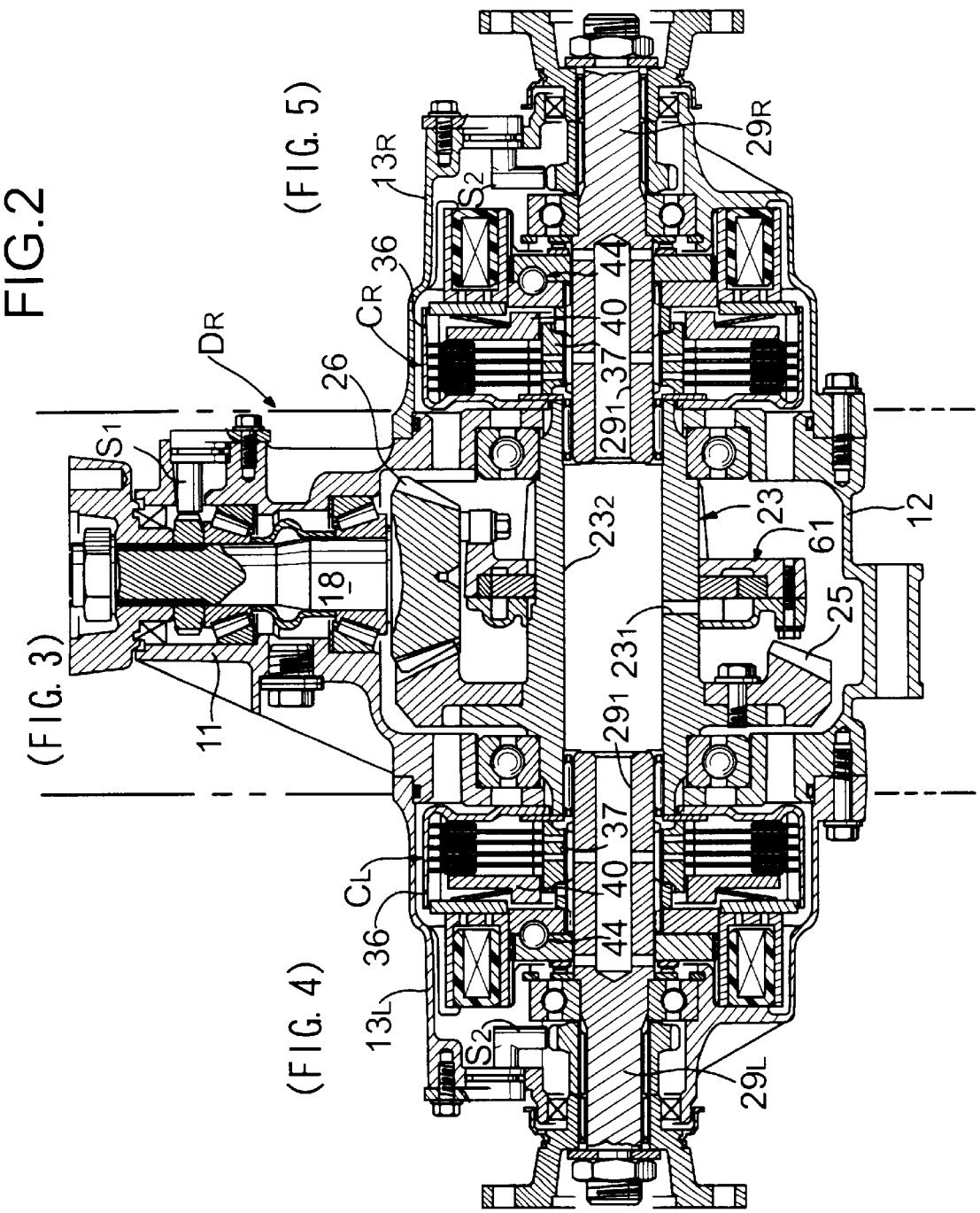
Figure 3:
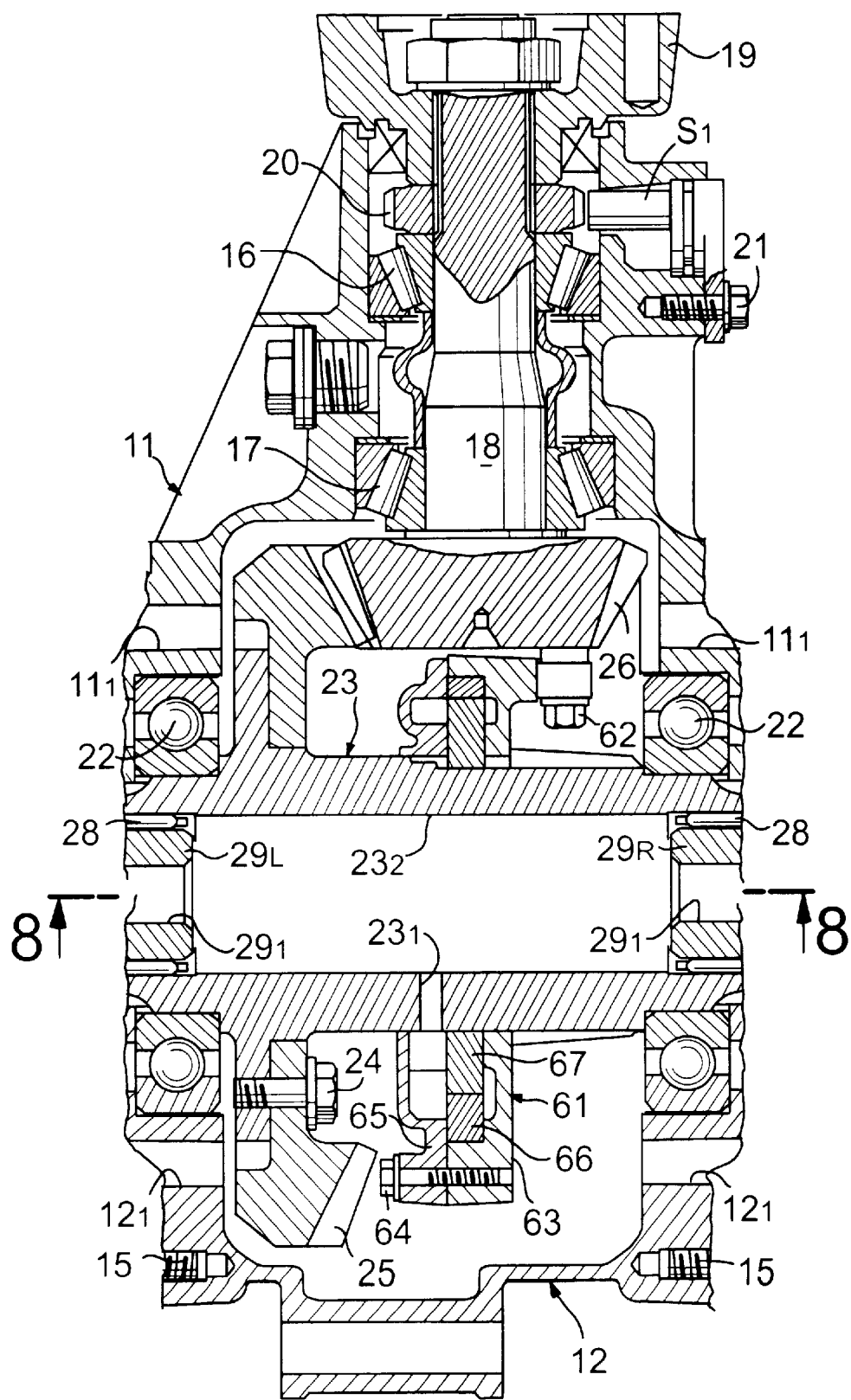

The present invention will now be described by way of an embodiment with reference to the accompanying drawings. Referring to FIG. 1, a four-wheel drive vehicle V includes an engine E laterally mounted at a front portion of a vehicle body, a transmission M provided integrally with the engine E, a front differential $D_F$ which connects the transmission M to drive shafts $1_L$ and $1_R$ of left and right front wheels $W_{FL}$ and $W_{FR}$, a transfer T which connects the front differential $D_F$ to a propeller shaft 2, and a rear differential $D_R$ which connects the propeller shaft 2 to drive shafts $3_L$ and $3_R$ of left and right rear wheels $W_{RL}$ and $W_{RR}$. The rear differential $D_R$ is capable of controlling the transmitting of a driving force to the drive shafts $3_L$ and $3_R$ of the rear wheels $W_{RL}$ and $W_{RR}$. When the transmitting of the driving force is cut off, the vehicle is brought into a front wheel drive state in which only the front wheels $W_{FL}$ and $W_{FR}$ are driven, and when the driving force is transmitted, the vehicle is brought into a four-wheel drive state in which both of the front wheels $W_{FL}$ and $W_{FR}$ and the rear wheels $W_{RL}$ and $W_{RR}$ are driven. Further, in the four-wheel drive state, the rear differential $D_R$ is capable of controlling the distribution of the driving force to the left and right rear wheels $W_{RL}$ and $W_{RR}$ to any extent.

Connected to an electronic control unit U are a front wheel speed sensor $S_1$ for detecting a front wheel speed based on a number of rotations of the propeller shaft 2, a pair of rear wheel speed sensors $S_2$, $S_2$ for detecting rear wheel speeds based on numbers of rotations of the left and right drive shafts $3_L$ and $3_R$ of the rear wheels $W_{RL}$ and $W_{RR}$, a steering angle sensor $S_3$ for detecting a steering angle of a steering wheel 4, a yaw rate sensor $S_4$ for detecting a yaw rate of the vehicle body, a lateral acceleration sensor $S_5$ for detecting a lateral acceleration of the vehicle body, and a differential lock switch $S_6$ for locking the rear differential $D_R$. The electronic control unit U controls left and right electromagnetic clutches $C_L$ and $C_R$ (which will be described hereinafter) mounted in the rear differential $D_R$ based on signals from the sensors $S_1$ to $S_5$ and the differential lock switch $S_6$.

The structure of the rear differential $D_R$ will be described with reference to FIGS. 2 to 9. The rear differential $D_R$ has a substantially laterally symmetric structure and hence, with the regard to the lateral symmetric portions, one namely, the left portion of the left and right portions will be described, and a duplicate description of the right portion is omitted.

The rear differential $D_R$ includes a casing means which is divided into a front center casing 11, a rear center casing 12 coupled to a rear surface of the front center casing 11 by a plurality of bolts 14 (see FIG. 8), a left side casing $13_L$ coupled to left sides of the center casings 11 and 12 by a plurality of bolts 15, and a right side casing $13_R$ coupled to right sides of the center casings 11 and 12 by a plurality of bolts 15.

An input shaft 18 is supported in the front center casing 11 by a pair of tapered roller bearings 16 and 17, and coupled at its front end to a rear end of the propeller shaft 2 (see FIG. 1) through a coupling 19. The front wheel speed sensor $S_1$ opposed to a rotor 20 fixed to the input shaft 18 to detect a number of rotations of the input shaft 18 is fixed to the front center casing 11 by a bolt 21. A hollow clutch drive shaft 23 is supported at its opposite ends in the front center casing 11 and the rear center casing 12 through a pair of ball bearings 22, 22, and a driven bevel gear 26 integrally formed at a rear end of the input shaft 18 is meshed with a follower bevel gear 25 fixed to the clutch drive shaft 23 by a bolt 24. The input shaft 18 and the clutch drive shaft 23 are in offset locations and are not on the same plane. Therefore, the follower bevel gear 25 and driven bevel gear 26, which are of a hypoid type, are used.

A left output shaft $29_L$ is supported coaxially with the clutch drive shaft 23 by a ball bearing 27 mounted on the left side casing $13_L$ and a needle bearing 28 mounted at a left end of the clutch drive shaft 23. The left drive shaft $3_L$ (see FIG. 1) is coupled at its right end to a left end of the left output shaft $29_L$ protruding from the left side casing $13_L$ through a coupling 30. The rear wheel speed sensor $S_2$ opposed to a rotor 31 fixed to the left output shaft $29_L$ to detect a number of rotations of the left output shaft $29_L$ is fixed to the left side casing $13_L$ by a bolt 32.

The left electromagnetic clutch $C_L$ accommodated in the left side casing $13_L$ includes a clutch outer 36 spline-coupled to the left end of the clutch drive shaft 23, a clutch inner 37 spline-coupled to a right end of the left output shaft $29_L$, a plurality of clutch disks 38 axially slidably but non-rotatably carried on an inner periphery of the clutch outer 36, a plurality of clutch plates 39 axially slidably but non-rotatably carried on an outer periphery of the clutch inner 37 and superposed alternately on the clutch disks 38, and a clutch piston 40 axially slidably carried on the outer periphery of the clutch inner 37 for bringing the clutch disks 38 and the clutch plates 39 into close contact with each other.

A ball cam mechanism 44 is provided on the outer periphery of the left output shaft $29_L$ and is comprised of a stationary cam member 41, a movable cam member 42 and a plurality of balls 43. A left side of the stationary cam member 41 is opposed to a right side of the ball bearing 27 with a thrust bearing 45 interposed therebetween, and a right side of the movable cam member 42 is opposed to a left side of the clutch inner 37 with a spring 46 interposed therebetween and opposed to a left side of the clutch piston 40 with a small gap left therebetween. An outer peripheral surface of the stationary cam member 41 is spline-coupled at 48 to an inner peripheral surface of a coil housing 47 which will be described hereinafter, and an inner peripheral surface of the movable cam member 42 is spline-coupled at 49 to an outer peripheral surface of the left output shaft $29_L$.

Figure 6:
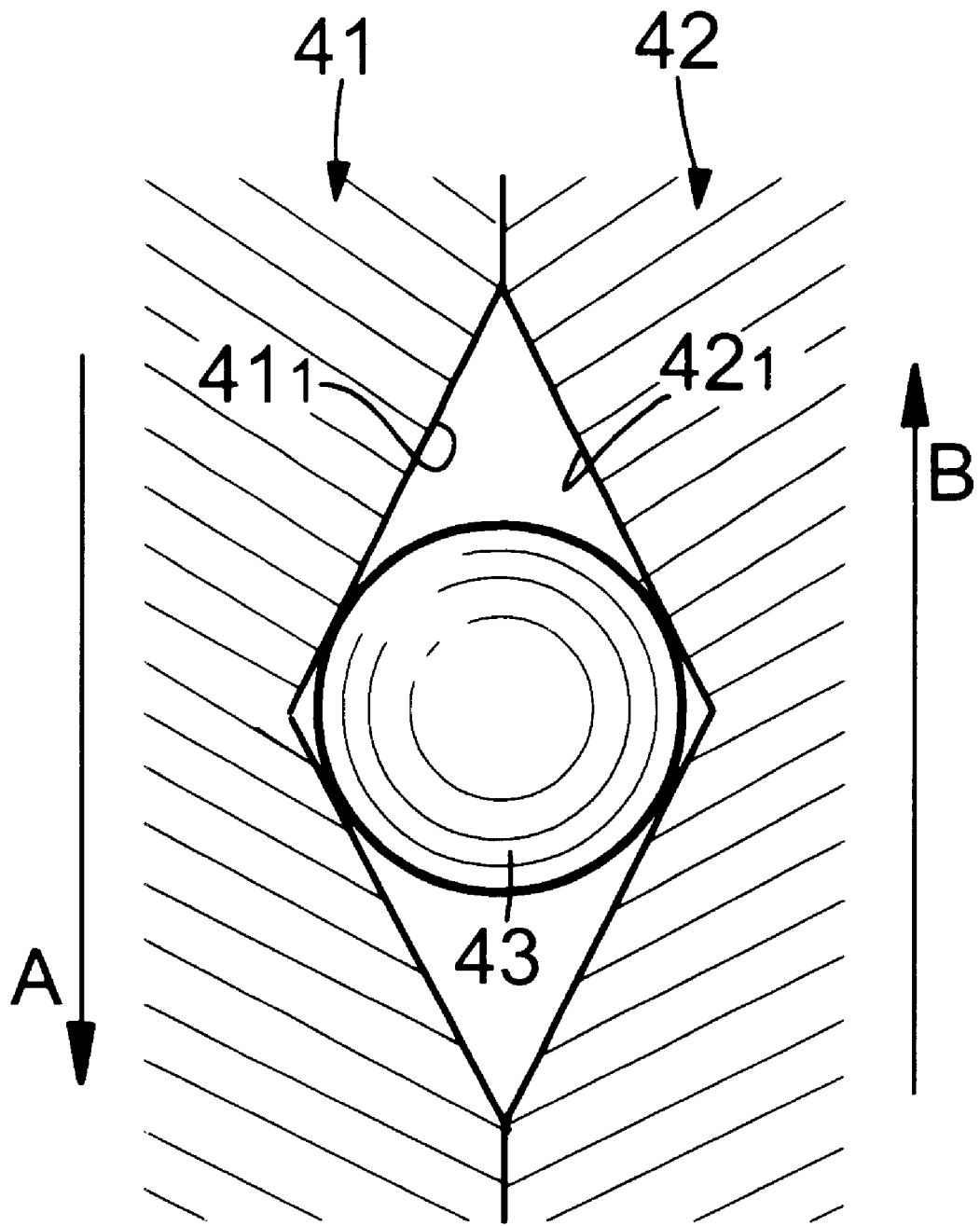

As can be seen by reference to FIG. 6 together with other Figures, triangular cam grooves $41_1$ and $42_1$ are defined at predetermined distances in opposed surfaces of the cam members 41 and 42 of the ball cam mechanism 44, and the balls 43 are disposed between opposed cam grooves $41_1$ and $42_1$.

Figure 7:
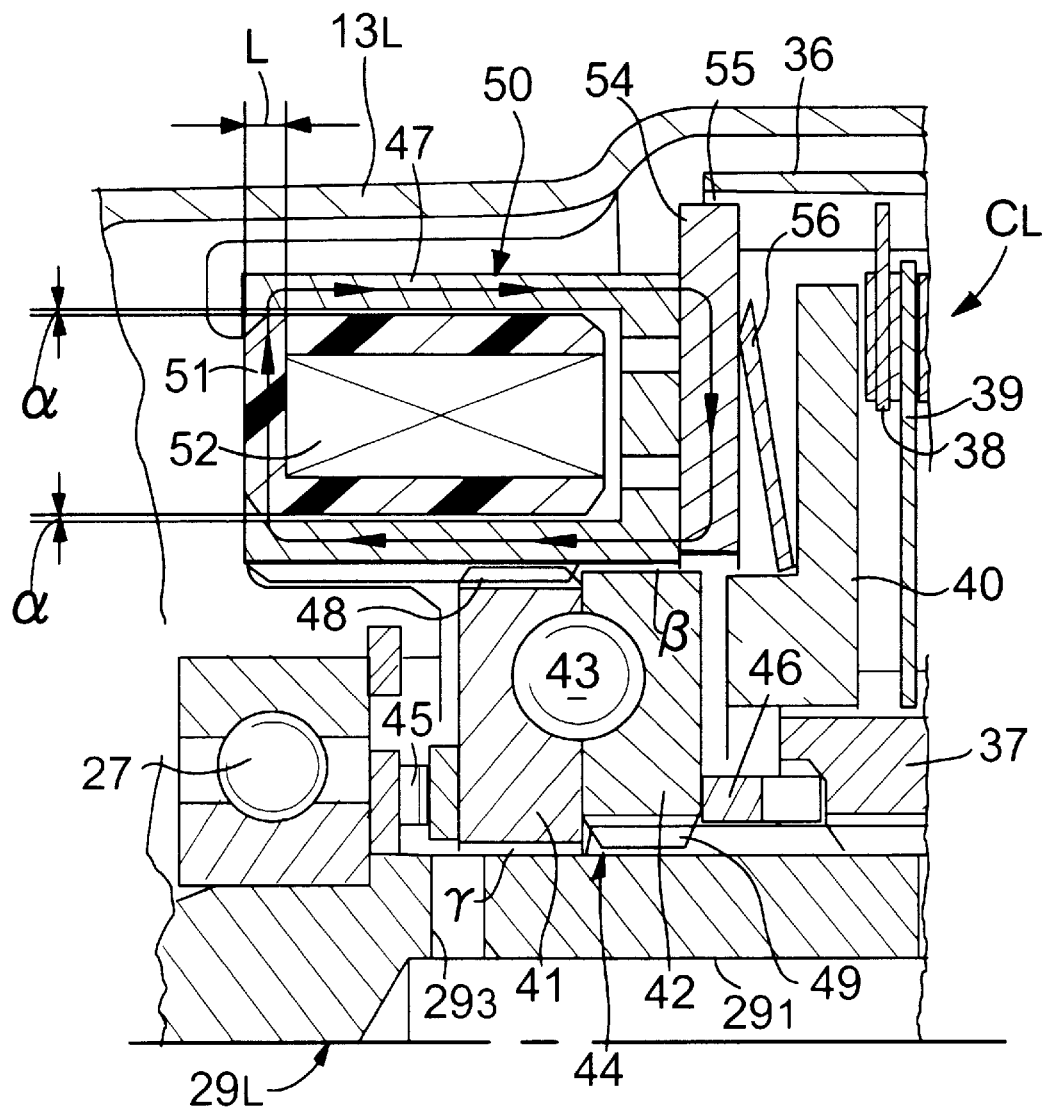

As can be seen from FIG. 7, a solenoid 50 is disposed radially outside the ball cam mechanism 44 and includes an annular coil 52 covered with an insulating material 51, the annular coil housing 47 which covers an inner peripheral surface, an outer peripheral surface and a right side of the coil 52, and an annular armature 54 disposed on a right side of the coil housing 47. The coil 52 is fixed to the left side casing $13_L$ by a means which is not shown, and the coil housing 47 is supported for rotation about the left output shaft $29_L$ through the ball cam mechanism 44. An outer periphery of the armature 54 is spline-coupled at 55 to the clutch outer 36, and a right side of the armature 54 is opposed to the left side of the clutch piston 40 with a belleville spring 56 interposed therebetween.

A left end (an end opposite from the armature 54) of the coil housing 47 protrudes leftwards by a distance L from a left end of the coil 52, whereby a magnetic closed circuit shown by a bold line is easily formed to enhance the magnetic flux density to increase the attracting force of the armature 54, as compared with a case where the left end of the coil housing 47 is terminated at a location on the right of the left end of the coil 52. Gaps $\alpha$, $\alpha$ are defined between the coil 52 fixed to the left side casing $13_L$ and the coil housing 47 which is rotated relative to the coil 52, but by minimizing the size of the gaps $\alpha$, $\alpha$ the magnetic flux density can be further enhanced. Further, by forming the coil 52, the coil housing 47 and the armature 54 from a material having a high relative magnetic permeability such as silicon, a permalloy, and the like, the magnetic closed circuit can be cut off in magnetism to prevent the magnetic flux from being leaked to another member.

A gap $\beta$ is defined between an outer peripheral surface of the movable cam member 42 and the inner peripheral surface of the coil housing 47, and a gap $\gamma$ is defined between an inner peripheral surface of the stationary cam member 41 and the outer peripheral surface of the left output shaft $29_L$. These gaps $\beta$ and $\gamma$ enable the amount of magnetic flux leaked from the magnetic closed circuit through the stationary and movable cam members 41 and 42 to the left output shaft $29_L$ to be suppressed to the minimum, thereby increasing the attracting force of the armature 54 and reducing the electric power consumed by the coil 52.

Figure 8:
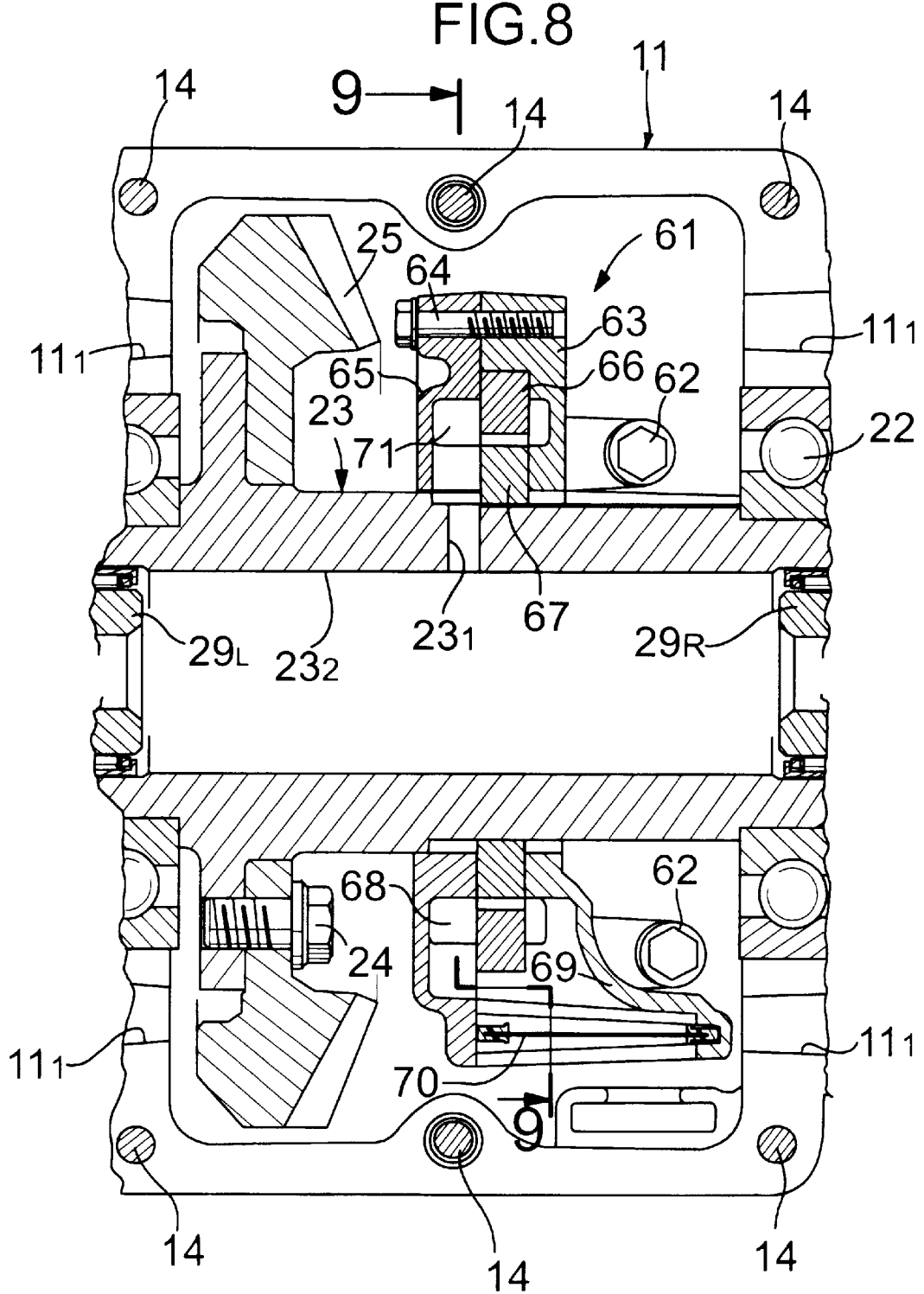
Figure 9:
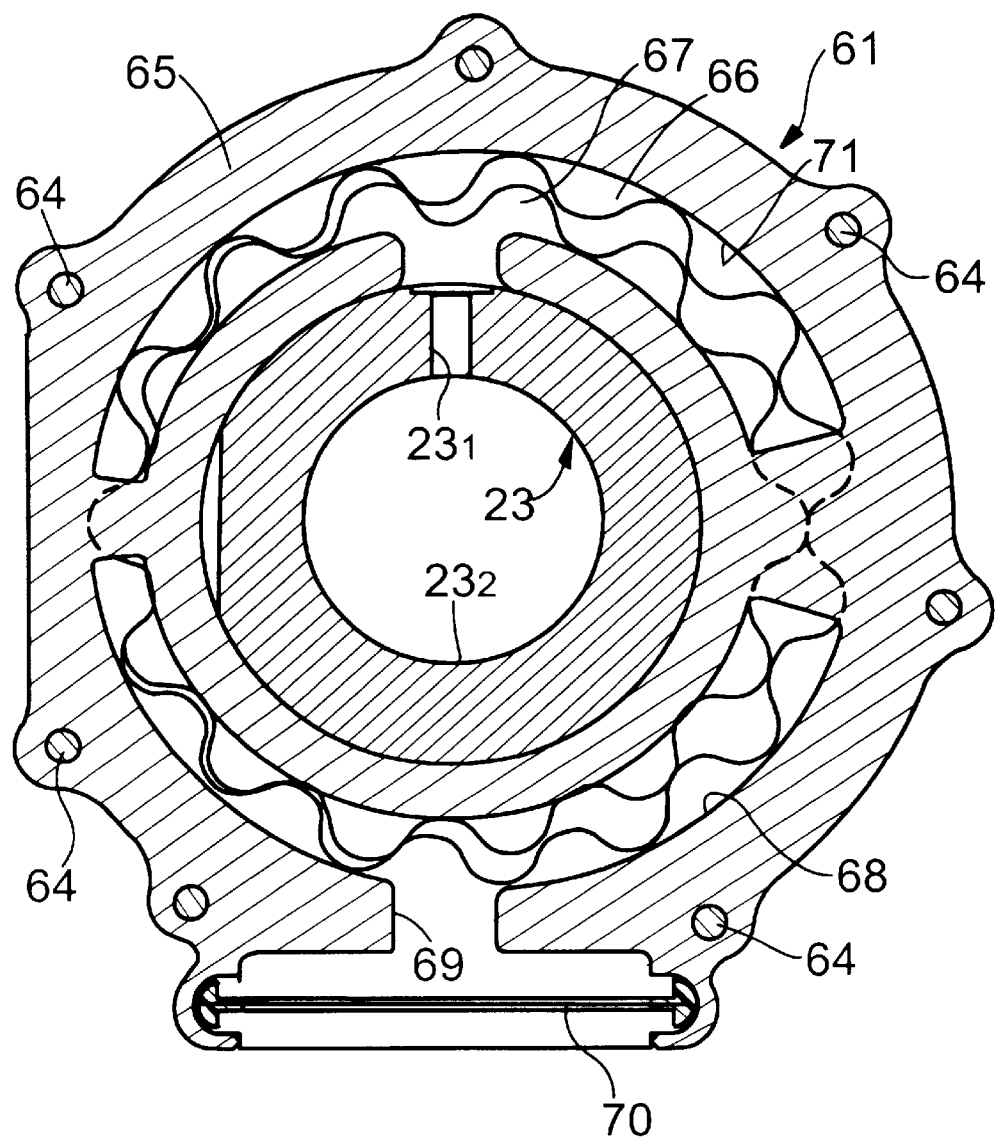

As can be seen by reference to FIGS. 8 and 9, an oil pump 61 accommodated in an internal space in the front center casing 11 and a rear center casing 12 is comprised of a trochoid pump and includes a pump housing 63 fixed to an inner surface of the front center casing 11 by bolts 62, 62 a pump cover 65 coupled to the pump housing 63 by bolts 64, an internally toothed outer rotor 66 rotatably accommodated within the pump housing 63 and the pump cover 65, and an externally toothed inner rotor 67 fixed to an outer periphery of the clutch drive shaft 23 and meshed with the outer rotor 66.

A lubricating oil is stored in a space below the front and rear center casings 11 and 12. An oil strainer 70 is mounted in an oil passage 69 extending downwards from an intake port 68 defined below the pump housing 63 and the pump cover 65, and is immersed in the oil. A discharge port 71 is defined above the pump housing 63 and the pump cover 65 to communicate with an oil passage $23_2$ axially defined in the clutch drive shaft 23 through an oil bore $23_1$ radially defined in the clutch drive shaft 23. The internal space in the front and rear center casings 11 and 12 communicates with an internal space in the left and right side casings $13_L$ and $13_R$ through a plurality of through-bores $11_1$ and $12_1$.

A right end of an oil passage $29_1$ axially defined in the left output shaft $29_L$ communicates with a left end of the oil passage $23_2$ axially defined in the clutch drive shaft 23. Oil bores $29_2$ and $29_3$ radially extending from the oil passage $29_1$ are defined in the left output shaft $29_L$. One oil bores $29_2$ face an oil bore $37_1$ defined in the clutch inner 37, and the other bores $29_3$ face the thrust bearing 45 disposed between the ball bearing 27 and the ball cam mechanism 44.

The operation of the embodiment of the present invention having the above-described construction will be described below.

At the start of the vehicle, a driving force from the engine E is first transmitted to the left and right front wheels $W_{FL}$ and $W_{FR}$ through the transmission M, the front differential $D_F$ and the drive shafts $1_L$ and $1_R$. The driving force from the engine E is also transmitted to the rear differential $D_R$ through the propeller shaft 2 to rotate the input shaft 18, the driven bevel gear 26, the follower bevel gear 25 and the clutch drive shaft 23. However, the left and right electromagnetic clutches $C_L$ and $C_R$ are in their non-engaged states and hence, the rear wheels $W_{RL}$ and $W_{RR}$ are not driven. At this time, the rotational speeds of the front wheels are detected by the front wheel speed sensor $S_1$ mounted on the input shaft 18 of the rear differential $D_R$, and the rotational speeds of the rear wheels are detected by the rear wheel speed sensors $S_2$, $S_2$ mounted on the left and right output shafts $29_L$ and $29_R$ of the rear differential $D_R$. However, at a moment when the driving force has been transmitted to the front wheels $W_{FL}$ and $W_{FR}$, the driving force is still not transmitted to the rear wheels $W_{RL}$ and $W_{RR}$ due to the fact that the left and right electromagnetic clutches $C_L$ and $C_R$ are in their non-engaged states. Therefore, a differential rotation is produced between the front wheels $W_{FL}$ and $W_{FR}$ and the rear wheels $W_{RL}$ and $W_{RR}$. When the differential rotation between the front wheels $W_{FL}$ and $W_{FR}$ and the rear wheels $W_{RL}$ and $W_{RR}$ is detected, the left and right electromagnetic clutches $C_L$ and $C_R$ are brought into their engaged states based on a signal from the electronic control unit U, thereby permitting the rotation of the clutch drive shaft 23 to be transmitted to the rear wheels $W_{RL}$ and $W_{RR}$ through the left and right output shafts $29_L$ and $29_R$ and the left and right drive shafts $3_L$ and $3_R$. In this manner, the vehicle V is brought into the four-wheel drive state.

Figure 4:
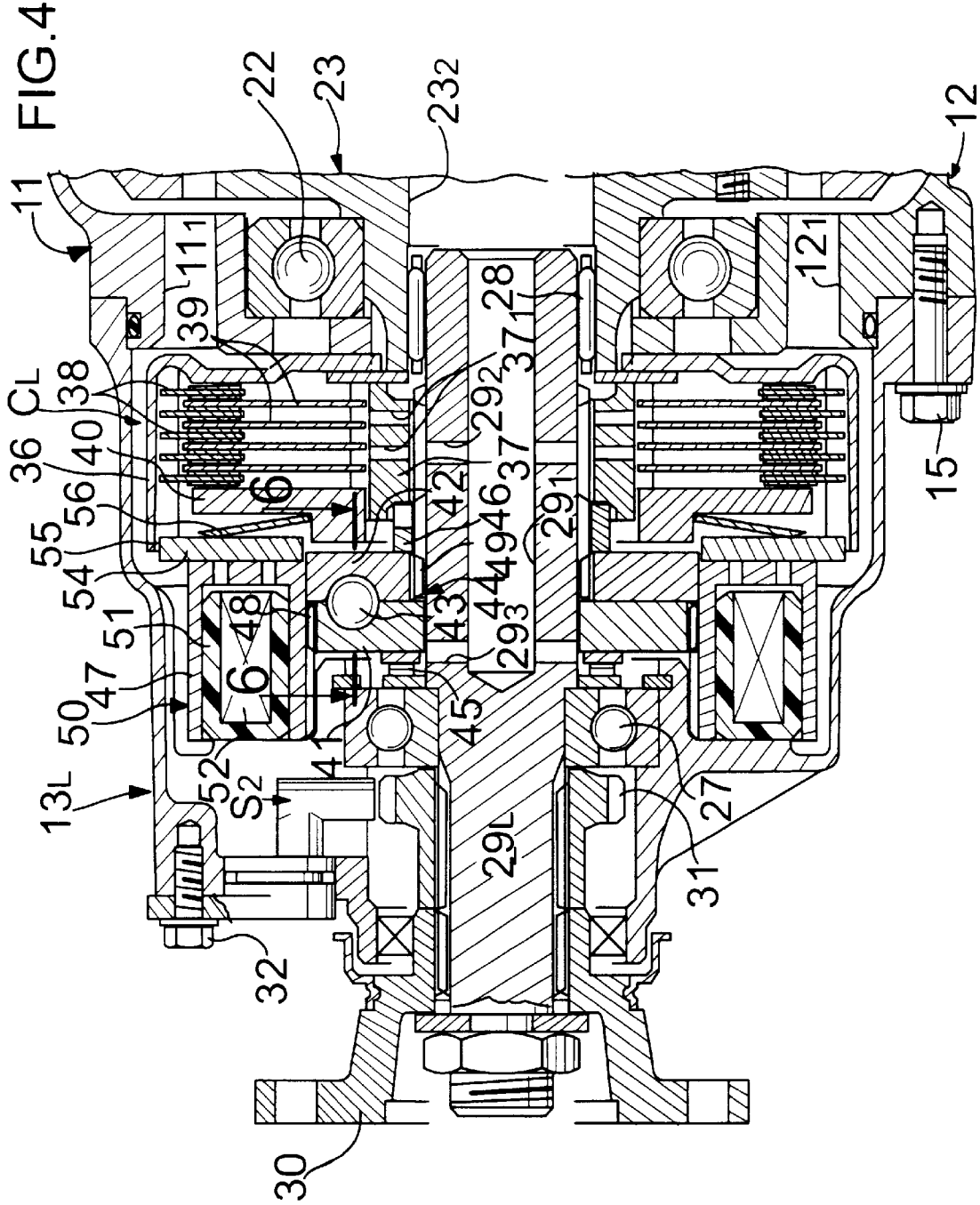
Figure 5:
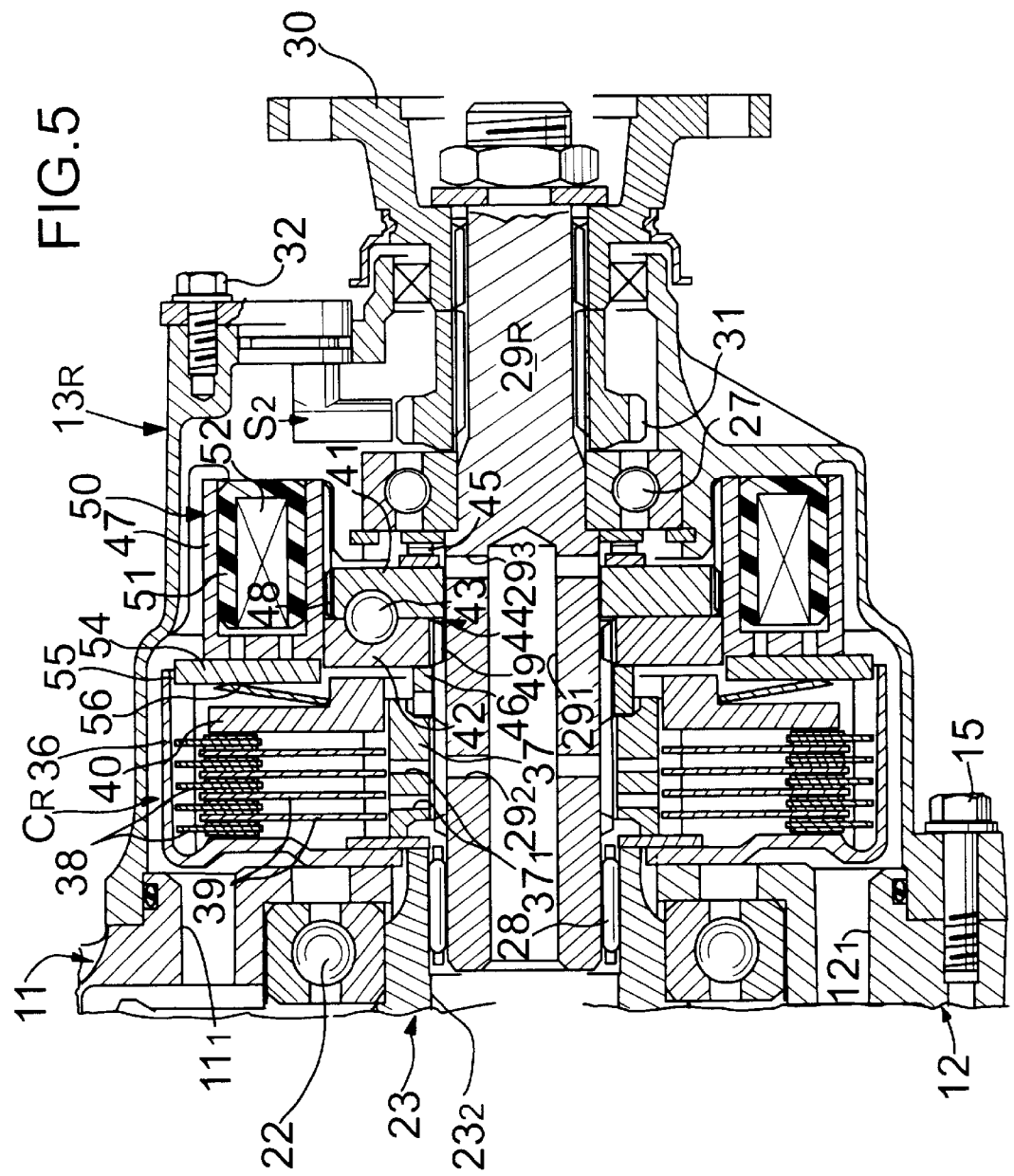

The operation of the electromagnetic clutches $C_L$ and $C_R$ will be described with the left electromagnetic clutch $C_L$ shown in FIG. 4 being taken as an example. When the solenoid 50 is in its non-energized state, the attraction of the armature 54 to the coil housing 47 has been released, and hence, the coil housing 47 and the armature 54 rotate relative to each other. In this state, the clutch drive shaft 23, the clutch outer 36, the clutch disks 38 and the armature 54 are in their integrated states, and the left output shaft $29_L$, the clutch inner 37, the clutch piston 40, the ball cam mechanism 44 and the coil housing 47 are also in their integrated states. Therefore. the transmission of the power from the clutch drive shaft 23 to the left output shaft $29_L$ has been cut off by slipping of the armature 54 relative to the coil housing 47.

When the coil 52 of the solenoid 50 is energized by a command from the electronic control unit U, the armature 54 is attracted to and integrated with the coil housing 47. As a result, the rotation of the clutch drive shaft 23 is transmitted through the clutch outer 36, the armature 54 and the coil housing 47 to the stationary cam member 41 of the ball cam mechanism 44, thereby producing the relative rotations shown by arrows A and B in FIG. 6 between the stationary cam member 41 integrated with the clutch drive shaft 23 and the movable cam member 42 integrated with the output shaft $29_L$. When the stationary cam member 41 and the movable cam member 42 have been rotated relative to each other, the movable cam member 42 is moved rightwards away from the stationary cam member 41 against a biasing force of the spring 46 by a reaction force received by the cam grooves $41_1$ and $42_1$ from the balls 43, and pushes the clutch piston 40 rightwards to bring the clutch disks 38 and the clutch plates 39 into engagement with each other.

Thus, the clutch outer 36 is coupled directly to the clutch inner 37 through the clutch disks 38 and the clutch plates 39, and the left electromagnetic clutch $C_L$ is brought into the engaged state, thereby permitting the rotation of the clutch drive shaft 23 to be transmitted to the left output shaft $29_L$. When the left and right electromagnetic clutches $C_L$ and $C_R$ have been brought into the engaged states in the above manner, the left and right rear wheels $W_{RL}$ and $W_{RR}$ are driven. In this manner, the vehicle V is brought into the four-wheel drive state.

The rear differential $D_R$ is capable of generating a difference between the engagement forces of the left and right electromagnetic clutches $C_L$ and $C_R$ by controlling a value of electric current supplied to the coils 52, 52 of the left and right solenoids 50, 50, so that any torque is distributed to the left and right rear wheels $W_{RL}$ and $W_{RR}$, thereby controlling the steering characteristic of the vehicle. A reference yaw rate is calculated based on a steering angle detected by the steering angle sensor $S_3$, a vehicle speed calculated based on outputs from the front wheel speed sensor $S_1$ and the rear wheel speed sensors $S_2$, $S_2$, and a lateral acceleration detected by the lateral acceleration sensor $S_5$, for example. during turning of the vehicle V. This reference yaw rate is compared with an actual yaw rate detected by the yaw rate sensor $S_4$. If the vehicle is in an over-steering tendency or an under-steering tendency as a result of the comparison, a control for eliminating the oversteering tendency or the under-steering tendency can be performed.

Specifically, when the vehicle is in the over-steering tendency, a yaw moment causing the vehicle body to be turned outwards as viewed during the turning of the vehicle can be generated to eliminate the over-steering tendency by increasing the engagement force of the electromagnetic clutch $C_L$ or $C_R$ that is on the inner side during turning of the vehicle, and decreasing the engagement force of the electromagnetic clutch $C_L$ or $C_R$ on the outer side during turning of the vehicle. When the vehicle is in the under-steering tendency, a yaw moment causing the vehicle body to be turned inwards as viewed during turning of the vehicle can be generated to eliminate the under-steering tendency by decreasing the engagement force of the electromagnetic clutch $C_L$ or $C_R$ on the inner side during turning of the vehicle, and increasing the engagement force of the electromagnetic clutch $C_L$ or $C_R$ on the outer side during turning of the vehicle.

When a driver has operated the differential lock switch $S_6$, the left and right electromagnetic clutches $C_L$ and $C_R$ are brought into the engaged states by the maximum transmitted torque. In this manner, the vehicle V is brought into the four-wheel drive state and a differential-locked state in which the left and right rear wheels $W_{RL}$ and $W_{RR}$ have been integrally coupled to each other, which can contribute to an increase in driving force when the vehicle runs out of a muddy place.

In this way, the four-wheel drive state and the front wheel drive state can be easily switched over from one to another in a simple structure in which the two electromagnetic clutches $C_L$ and $C_R$ are merely provided with the rear differential $D_R$. Moreover, any driving force can be distributed to the left and right rear wheels $W_{RL}$ and $W_{RR}$, and a differential locking mechanism can be provided.

The appropriate magnitude of the maximum transmitted torque transmitted to the rear wheels $W_{RL}$ and $W_{RR}$ through the rear differential $D_R$ is varied depending upon the friction coefficient of a road surface. It is desirable that for a road surface of a smaller friction coefficient, the maximum transmitted torque is decreased, and for a road surface of a larger friction coefficient, the maximum transmitted torque is increased. If the maximum transmitted torque is set according to the following expression: weight of rear wheel axle x friction coefficient of road surface x radius of tire, a maximum transmitted torque suitable for the friction coefficient of a road surface can be obtained.

If the maximum transmitted torque is set at a larger value such that it is suited for a road surface of a higher friction coefficient such as an asphalt covered road, the required capacity of the electromagnetic clutches $C_L$ and $C_R$ is increased, whereby the size of the electromagnetic clutches $C_L$ and $C_R$ is increased. However, a maximum transmitted torque suitable for any of various road surfaces of different friction coefficients can be obtained by limiting the engagement forces of the electromagnetic clutches $C_L$ and $C_R$ on a road surface of a lower friction coefficient such as a snow-laden road. If the maximum transmitted torque is set at a smaller value such that it is suited for a road surface of a lower friction coefficient, the size of the electromagnetic clutches $C_L$ and $C_R$ can be reduced and in its turn, the size of the rear differential $D_R$ can be reduced, but on a road surface of a higher friction coefficient, the maximum transmitted torque may be insufficient in some cases.

Figure 10:
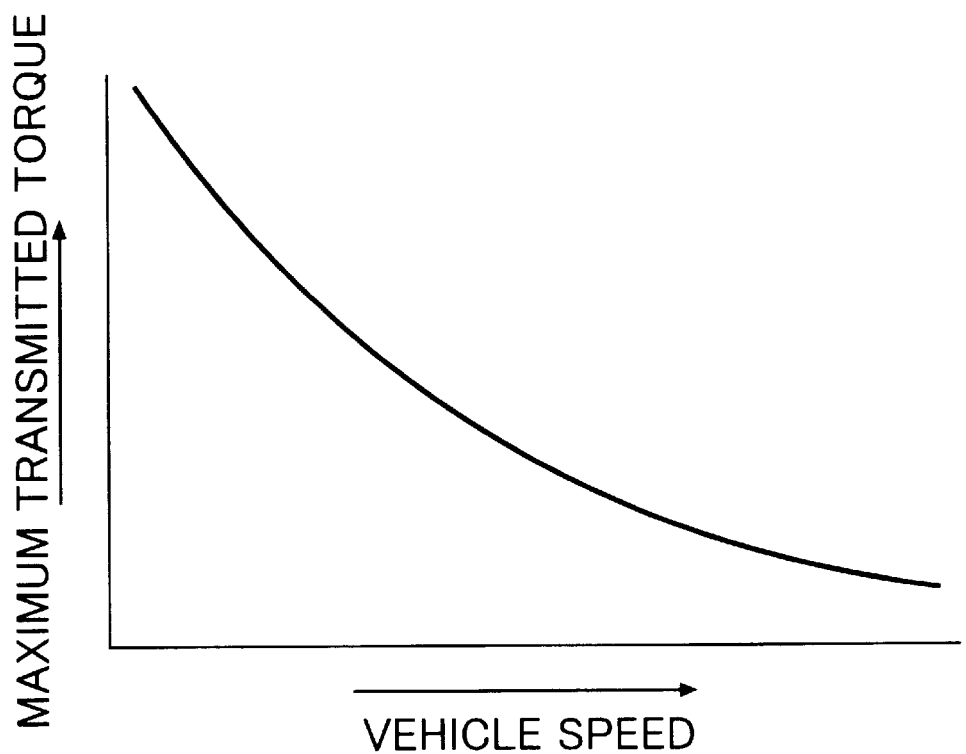

By setting the maximum transmitted torque transmitted to the rear wheels $W_{RL}$ and $W_{RR}$ through the rear differential $D_R$, so that the maximum transmitted torque assumes a maximum value when the vehicle speed is lower, and the maximum transmitted torque is decreased with an increase in vehicle speed, as shown in FIG. 10, the sizes of the electromagnetic clutches $C_L$ and $C_R$, the driven bevel gear 26 and the follower bevel gear 25 can be reduced, and the durability thereof can be enhanced. Namely, the horsepower of the engine E transmitted to the rear wheels $W_{RL}$ and $W_{RR}$ through the rear differential $D_R$ is proportional to the product of the maximum transmitted torque and the vehicle speed. However, if the maximum transmitted torque is decreased with the increase in vehicle speed, it is possible to prevent the horsepower transmitted to the rear wheels $W_{RL}$ and $W_{RR}$ from being increased in accordance with the increase in vehicle speed. Thus, even if the sizes of the electromagnetic clutches $C_L$ and $C_R$, the driven bevel gear 26 and the follower bevel gear 25 are reduced, it is possible to prevent a reduction in durability due to the transmission of a larger horsepower when at a higher vehicle speed.

Now, when the clutch drive shaft 23 of the rear differential $D_R$ is rotated, the inner rotor 67 and the outer rotor 66 of the oil pump 61 accommodated in the front and rear center casings 11 and 12 are rotated, thereby causing the oil stored in the front and rear center casings 11 and 12 to be drawn from the oil strainer 70 via the oil passage 69 into the intake port 68 and supplied from the discharge port 71 via the oil bore $23_1$ into the oil passage $23_2$ defined in the clutch drive shaft 23. The oil flowing from the oil passage $23_2$ in the clutch drive shaft 23 into the oil passages $29_1$, $29_1$ in the left and right output shafts $29_L$ and $29_R$ flows through the oil bores $29_2$ and $29_3$ extending radially from the oil passages $29_1$, $29_1$ to the outside of the clutch drive shaft 23. A portion of this oil is passed through the oil bores $37_1$ defined in the clutch inner 37 to lubricate the clutch disks 38 and the clutch plates 39, and another portion of the oil lubricates the ball bearings 27, 27, the needle bearings 28, 28, the ball cam mechanisms 44, 44, the thrust bearings 45, 45 and the like. The oil after completion of the lubrication is returned from the left and right side casings $13_L$ and $13_R$ through the through-bores $11_1$ and $12_1$ into the front and rear center casings 11 and 12.

Since the oil pump 61 is disposed at the location in which it is sandwiched between the left and right electromagnetic clutches $C_L$ and $C_R$, as described above, the length of the oil passages for supplying the oil from the oil pump 61 to the electromagnetic clutches $C_L$ and $C_R$ can be minimized. Moreover, the oil passages $23_2$ and $29_1$, $29_1$ are defined to extend through the insides of the clutch drive shaft 23 and the left and right output shafts $29_L$ and $29_R$ which are connected in series, a special piping is not required, but also the resistance to flow of the oil is decreased.

If the driven bevel gear 26 and the follower bevel gear 25 are disposed within the front and rear center casings 11 and 12, a dead space with two ways surrounded by the bevel gears 25 and 26 is created, but the increase in size of the front and rear center casings 11 and 12 can be prevented by disposing the oil pump 61 utilizing such dead space. Particularly, since the oil pump 61 is comprised of the trochoid pump with the inner rotor 67 thereof being fixed to the clutch drive shaft 23, the layout of the oil pump 61 in the dead space is facilitated. Moreover, the oil passage 69 connected to the intake port 68 of the oil pump 61 opens directly into the bottoms of the front and rear center casings 11 and 12 and hence, it is possible to effectively prevent the inclusion of air during inclination of the vehicle V. Further, the follower bevel gear 25 and the oil pump 61 disposed in the internal space in the front and rear center casings 11 and 12 exhibit a function of a baffle plate and hence, it is possible to inhibit waving or turbulence of the oil surface to further effectively prevent the inclusion of air.

Since the casing means of the rear differential $D_R$ is divided into the four portions: the front center casing 11, the rear center casing 12 and the left and right side casings $13_L$ and $13_R$, checking and regulation of the meshed states of the driven bevel gear 26 and the follower bevel gear 25 assembled in the front and rear center casings 11 and 12 can be easily carried out by removing the left and right side casings $13_L$ and $13_R$ and separating the rear center casing 12 from the front center casing 11. Moreover, maintenance of the electromagnetic clutches $C_L$ and $C_R$ assembled within the left and right side casings $13_L$ and $13_R$ can be easily carried out by removing only the left and right side casings $13_L$ and $13_R$. Further, the structure of a mold used for producing the casing means in a casting process can be simplified, as compared with a case where the casing means is divided into only two portions.

Although the preferred embodiment of the present invention has been described in detail, it will be understood that the present invention is not limited to the above-described embodiment, and various modifications may be made without departing from the spirit and scope of the invention defined by the claims.

For example, in place of the left and right clutches $C_L$ and $C_R$ being comprised of the electromagnetic clutches, they may be comprised of hydraulic clutches. In addition, the present invention is not limited to a front engine vehicle, and is also applicable to a rear engine vehicle and a midship engine vehicle. The differential having left and right clutches $C_1$ and $C_2$ is also not limited to a rear differential but may also be a front differential.

What is claimed is:

1. A four wheel drive vehicle comprising:

an engine;

left and right front wheels and left and right rear wheels;

means for transmitting a driving force from said engine to said front wheels and said rear wheels through differentials;

an input shaft connecting with one of said differentials for transmitting said driving force thereto;

left and right clutches being included in said one differential and being interposed between said input shaft and each of said left and right wheels associated with said one differential, said left and right clutches being capable of selectively coupling either of said left and right wheels to said input shaft with any engagement force;

an input means separate from said clutches and operable by the operation of a vehicle driver to bring said left and right clutches into engagement with a maximum engagement force;

a wheel speed detecting means for detecting wheel speeds when said input means is operated;

control means for controlling the engagement force of said left and right clutches, said control means controlling the engagement force of the clutches to reduce the driving force to said associated wheels in response to an increase in said wheel speeds and including:

releasable cooperating members capable, when engaged, of coupling a selected one of said left wheel and said right wheel to said input shaft;

an electromagnetic coil carried by one of said clutch members employed for operating the selected wheel;

a cam mechanism having a stationary cam fixed with respect to said electromagnetic coil and a movable cam operative to move away from said stationary cam upon the occurrence of relative rotational movement between said movable cam and said stationary cam;

a clutch piston operated by said movable cam to interconnect said clutch member upon relative movement between said cams; and an armature carried by the other of said clutch members employed for operating the selected wheel operative, upon activation of said coil, to impart relative movement between said cams for connecting the clutch member in order to drive the selected wheel.

* * * * *